United States Patent [19]

Takahashi

[11] Patent Number: 5,166,804

[45] Date of Patent: Nov. 24, 1992

[54] REPRODUCTION APPARATUS DESIGNATING AUDIO AND/OR VIDEO SIGNALS TO BE REPRODUCED

[75] Inventor: Hirokazu Takahashi, Yokohama, Japan

[73] Assignee: Canon Kabushiki Kaisha, Tokyo, Japan

[21] Appl. No.: 724,447

[22] Filed: Jul. 3, 1991

Related U.S. Application Data

[63] Continuation of Ser. No. 213,841, Jun. 30, 1988, abandoned.

[30] Foreign Application Priority Data

Jul. 4, 1987 [JP] Japan ............................. 62-167643

[51] Int. Cl.$^5$ .............................................. H04N 5/781
[52] U.S. Cl. .................................. 358/341; 358/342; 360/10.1; 369/50
[58] Field of Search ............................. 360/10.1–10.3, 360/14.1–14.3, 19.1, 35.1; 369/32, 50, 52, 59; 358/310, 312, 335, 341–343, 906, 909, 143, 160

[56] References Cited

U.S. PATENT DOCUMENTS

| | | | |
|---|---|---|---|
| 3,878,560 | 4/1975 | Ramage | 360/35.1 |
| 4,725,897 | 2/1988 | Konishi | 360/10.1 |
| 4,777,537 | 10/1988 | Ueno et al. | 358/341 |

Primary Examiner—Wayne R. Young
Attorney, Agent, or Firm—Fitzpatrick, Cella, Harper & Scinto

[57] ABSTRACT

Disclosed is a reproduction apparatus for reproducing signals from a recording medium which is capable of recording audio and video signals. The reproduction apparatus includes a memory which stores information regarding the content of recording on the recording medium; a reproduction mode selection device which selects at least three reproduction modes which include a mode for reproducing sound and image, a mode for reproducing sound only and a mode for reproducing image only; and a reproduction device which reproduces signals recorded on the recording medium with reference to the information stored in the memory according to the reproduction mode selected by the reproduction mode selection device.

10 Claims, 7 Drawing Sheets

Fig. 3

| TRACK NUMBER | 1 | 2 | 3 | 4 | 5 | 6 | 7 | 8 | 9 | 10 | 11 | 12 | 13 | 14 | 15 | 16 | 17 | 18... |
|---|---|---|---|---|---|---|---|---|---|---|---|---|---|---|---|---|---|---|
| TYPE | $V_1$ | $V_2$ | $A_1^1$ | $V_4$ | $V_5$ | $V_6$ | $A_1^2$ | $V_8$ | $A_1^3$ | $V_{10}$ | $A_1^4$ | $V_{12}$ | $V_{13}$ | $A_2^1$ | $A_2^2$ | $V_{16}$ | $V_{17}$ | $A_2^3$... |
| AUDIO SEQUENCE 1 | | | $A_1^1$ | | | | $A_1^2$ | | $A_1^3$ | | $A_1^4$ | | | | | | | |
| AUDIO SEQUENCE 2 | | | $A_2^1$ | | | | $A_2^2$ | | | | | | | $A_2^3$ | | | | |

Fig. 5

| TRACK NUMBER | 1 | 2 | 3 | 4 | 5 | 6 | 7 | 8 | 9 | 10 | 11 | 12 | 13 | 14 | 15 | 16 | 17 | 18... |
|---|---|---|---|---|---|---|---|---|---|---|---|---|---|---|---|---|---|---|
| TYPE | $A_1^1$ | $V_2$ | $A_1^2$ | $V_4$ | $V_5$ | $A_2^1$ | $A_2^2$ | $V_8$ | $A_2^3$ | $V_{10}$ | $A_3^1$ | $V_{12}$ | $V_{13}$ | $V_{14}$ | $A_3^2$ | $A_4^1$ | $A_4^2$ | $V_{18}$ |
| CORRESPONDENCE OF VIDEO SIGNAL — AUDIO SEQUENCE 1 | | | | | | | | | | | $A_3^1$ | | | | | $A_4^1$ | | |
| AUDIO SEQUENCE 2 | | | $A_1^2$ | | | | $A_2^2$ | | | | | | | | $A_3^2$ | | $A_4^2$ | |
| AUDIO SEQUENCE 3 | | | | | | | | | $A_2^3$ | | | | | | | | | |
| AUDIO SEQUENCE 4 | $A_1^1$ | | | | | $A_2^1$ | | | | | | | | | | | | |

Fig. 4

| REGENERATION MODE | | REGENERATION SEQUENCE | | | | | | | | | | | | | | | | | |
|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18-- |
| VIDEO PRECEDENCE | 1 V | $V_1$ | $V_2$ | $V_4$ | $V_6$ | $V_{10}$ | $V_4$ | $V_6$ | $V_{12}$ | $V_{13}$ | $V_5$ | $V_8$ | $V_{16}$ | $V_{17}$ | | | | | |
| | 1 A | — | — | $A_2^1$ | $A_2^2$ | $A_2^3$ | $A_1^1$ | $A_1^2$ | $A_1^3$ | $A_1^4$ | — | — | — | — | | | | | |
| | 2 V | | | | | | | | | | | | | | | | | | |
| | 2 A | $A_2^1$ | $A_2^2$ | $A_2^3$ | $A_1^1$ | $A_1^2$ | $A_1^3$ | $A_1^4$ | | | | | | | | | | | |
| | 3 V | $V_1$ | $V_2$ | $V_4$ | $V_5$ | $V_6$ | $V_8$ | $V_{10}$ | $V_{12}$ | $V_{13}$ | $V_{16}$ | $V_{17}$ | | | | | | | |
| | 3 A | | | | | | | | | | | | | | | | | | |
| AUDIO PRECEDENCE | 1 V | $V_1$ | $V_2$ | $V_4$ | $V_6$ | $V_{12}$ | $V_{13}$ | $V_5$ | $V_8$ | $V_4$ | $V_6$ | $V_{10}$ | $V_{16}$ | $V_{17}$ | | | | | |
| | 1 A | — | — | $A_1^1$ | $A_1^2$ | $A_1^3$ | $A_1^4$ | — | — | $A_2^1$ | $A_2^2$ | $A_2^3$ | — | — | | | | | |
| | 2 V | | | | | | | | | | | | | | | | | | |
| | 2 A | $A_1^1$ | $A_1^2$ | $A_1^3$ | $A_1^4$ | $A_2^1$ | $A_2^2$ | $A_2^3$ | | | | | | | | | | | |
| | 3 V | $V_1$ | $V_2$ | $V_4$ | $V_5$ | $V_6$ | $V_8$ | $V_{10}$ | $V_{12}$ | $V_{13}$ | $V_{16}$ | $V_{17}$ | | | | | | | |
| | 3 A | | | | | | | | | | | | | | | | | | |

Fig. 6

| Regeneration Mode | | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| VIDEO PRECEDENCE | 1 V | $V_2$ | $V_{13}$ | $V_4$ | $V_8$ | $V_{12}$ | $V_5$ | $V_{10}$ | $V_{14}$ | $V_{18}$ | | | | | | | | | |
| | 1 A | $A_3^1$ | $A_3^2$ | $A_2^1$ | $A_2^2$ | $A_2^3$ | $A_1^1$ | $A_1^2$ | $A_4^1$ | $A_4^2$ | | | | | | | | | |
| | 2 V | — | — | — | — | — | — | — | — | — | | | | | | | | | |
| | 2 A | $A_3^1$ | $A_3^2$ | $A_2^1$ | $A_2^2$ | $A_2^3$ | $A_1^1$ | $A_1^2$ | $A_4^1$ | $A_4^2$ | | | | | | | | | |
| | 3 V | $V_2$ | $V_4$ | $V_5$ | $V_8$ | $V_{10}$ | $V_{12}$ | $V_{13}$ | $V_{14}$ | $V_{18}$ | | | | | | | | | |
| | 3 A | — | — | — | — | — | — | — | — | — | | | | | | | | | |
| AUDIO PRECEDENCE | 1 V | $V_5$ | $V_{10}$ | $V_4$ | $V_8$ | $V_{12}$ | $V_2$ | $V_{13}$ | $V_{14}$ | $V_{18}$ | | | | | | | | | |
| | 1 A | $A_1^1$ | $A_1^2$ | $A_2^1$ | $A_2^2$ | $A_2^3$ | $A_3^1$ | $A_3^2$ | $A_4^1$ | $A_4^2$ | | | | | | | | | |
| | 2 V | — | — | — | — | — | — | — | — | — | | | | | | | | | |
| | 2 A | $A_1^1$ | $A_1^2$ | $A_2^1$ | $A_2^2$ | $A_2^3$ | $A_3^1$ | $A_3^2$ | $A_4^1$ | $A_4^2$ | | | | | | | | | |
| | 3 V | $V_2$ | $V_4$ | $V_5$ | $V_8$ | $V_{10}$ | $V_{12}$ | $V_{13}$ | $V_{14}$ | $V_{18}$ | | | | | | | | | |
| | 3 A | — | — | — | — | — | — | — | — | — | | | | | | | | | |

Regeneration Sequence (columns 1–18)

REPRODUCTION APPARATUS DESIGNATING AUDIO AND/OR VIDEO SIGNALS TO BE REPRODUCED

This application is a continuation of prior application Ser. No. 07/213,841 filed Jun. 30, 1988, now abandoned.

BACKGROUND OF THE INVENTION

1. Field of the Invention

The present invention relates to a reproduction apparatus for reproducing signals from a medium on which a plurality of signals, for example audio signals and video signals, are recorded.

2. Related Background Art

For recording and reproducing video and audio signals, video tape recorders are already known. In addition, a still video system has recently been developed for magnetically recording still images and an audio signal on a disk-shaped magnetic recording medium, and a united format has been announced therefor.

The united recording format defines the order of reproduction of sounds and corresponding images with respect to a continuous audio sequence, but does not define the order of reproduction of a plurality of audio sequences if such plurality of audio sequences are present on the same recording medium. Also, reproduction according to audio sequences does not provide still images not corresponding to the sounds.

It has therefore been difficult, in a case when a plurality of audio signals and a plurality of video signals are recorded in mixed manner on a recording medium, to satisfactorily reproduce both the audio and video signals in a desirable sequence.

SUMMARY OF THE INVENTION

In consideration of the foregoing, an object of the present invention is to provide a reproduction apparatus capable of efficient signal reproduction from a medium on which mutually different signals, such as video signals and audio signals are recorded.

Another object of the present invention is to provide a reproduction apparatus capable of easily selecting various reproduction methods in signal reproduction from a medium on which video signals and audio signals are recorded in a mixed manner.

The above-mentioned objects can be achieved according to a preferred embodiment of the present invention by a reproduction apparatus for reproducing signals from a recording medium capable of recording audio and video signals, provided with memory means for storing information on the content of recording on the recording medium; reproduction mode selection means for selecting at least three reproduction modes including a mode for reproducing sound and image, a mode for reproducing sound only, and a mode for reproducing image only; and reproduction means for reproducing signals recorded on the recording medium with reference to the information stored in said memory means according to the reproduction mode selected by said reproduction mode selection means.

In such a reproduction apparatus, the reproduction mode is appropriately controlled according to the selected reproduction mode.

Other objects and features of the present invention will become apparent from the following description which is to be taken in connection with the attached drawings.

BRIEF DESCRIPTION OF THE DRAWINGS

FIGS. 3 to 6 are charts showing the sequence of reproduction of the apparatus of the preferred embodiment.

DETAILED DESCRIPTION OF THE PREFERRED EMBODIMENTS

Now, the present invention will be discussed in detail by embodiments thereof shown in the attached drawings.

Figure 1:
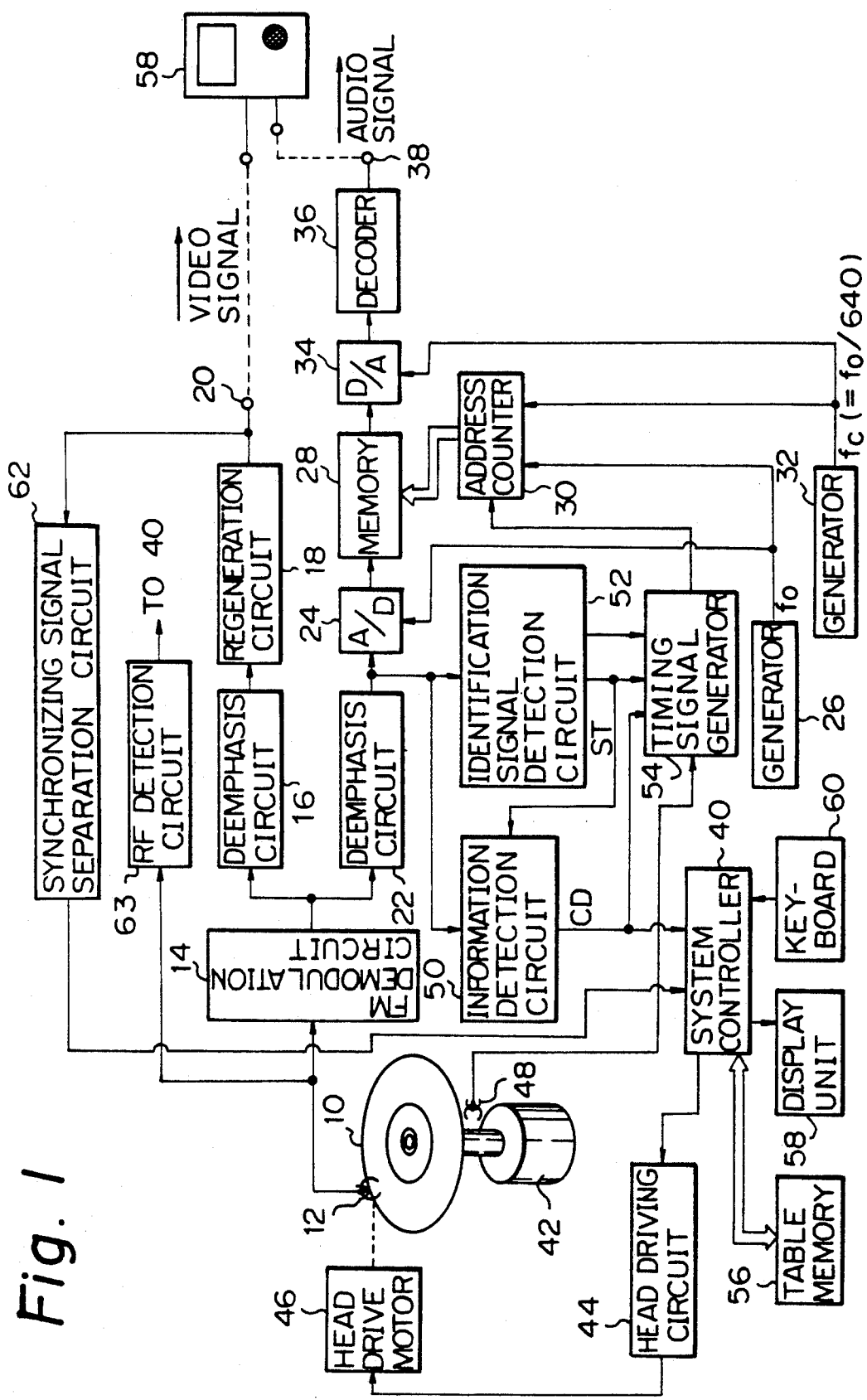
FIG. 1 is a block diagram of an embodiment of the present invention.

Referring to FIG. 1, a signal reproduced from a video floppy disk 10 by means of a magnetic head 12 is supplied to an FM demodulation circuit 14 for FM demodulation. When the magnetic head 12 traces a recording track of a video signal, the video signal component of the demodulated signal is supplied to an output terminal 20 through a non-linear deemphasis circuit 16 and a regeneration circuit 18. When the magnetic head 12 traces a recording track of an audio signal, the audio signal component demodulated by the FM demodulation circuit 14 is supplied, through a linear deemphasis circuit 22, to an A/D converter 24. The A/D converter 24 effects conversion to a digital signal with the output timing of an oscillator 26, and the obtained digital signals are stored in a memory 28 with the same timing. The memory 28 is provided with an address counter 30. The audio signal stored in the memory 28 is read according to read-out addresses of the address counter 30 varying with the timing defined by the oscillation frequency of another oscillator 32, then converted into an analog signal with the timing in a D/A converter 34, decoded in a decoder 36 and released from an output terminal 38.

Further provided are a system controller 40 for controlling the entire system; a driving motor 42 for the disk 10; a head driving circuit 44; a head driving motor 46; a PG coil 48 for detecting the rotational phase of the disk 10; an information detecting circuit 50 for detecting a control code or an ID code, to be explained later; an identification signal detecting circuit for detecting a start flag or an end flag, to be explained later, a timing signal generating circuit 54 for generating a signal for starting the signal writing into the memory 28 based on the PG signal from the PG coil 48 and the start and end flags; a table memory 56 for storing various information relating to the signals recorded on the disk 10; a monitor device 58; a display unit 58' for indicating the state of function of the system controller 40; a keyboard 60; a synchronization signal separating circuit 62; and an RF detecting circuit 63 for detecting the presence or absence of a reproduction output from the head 12. The keyboard 60 is provided with an audio reproduction switch 101; a video reproduction switch 102; a switch 103 for selecting audio preferential reproduction or video preferential reproduction; a start switch 105 for starting the reproducing operation, and a search switch 106, which are to be explained later.

Figure 7A:
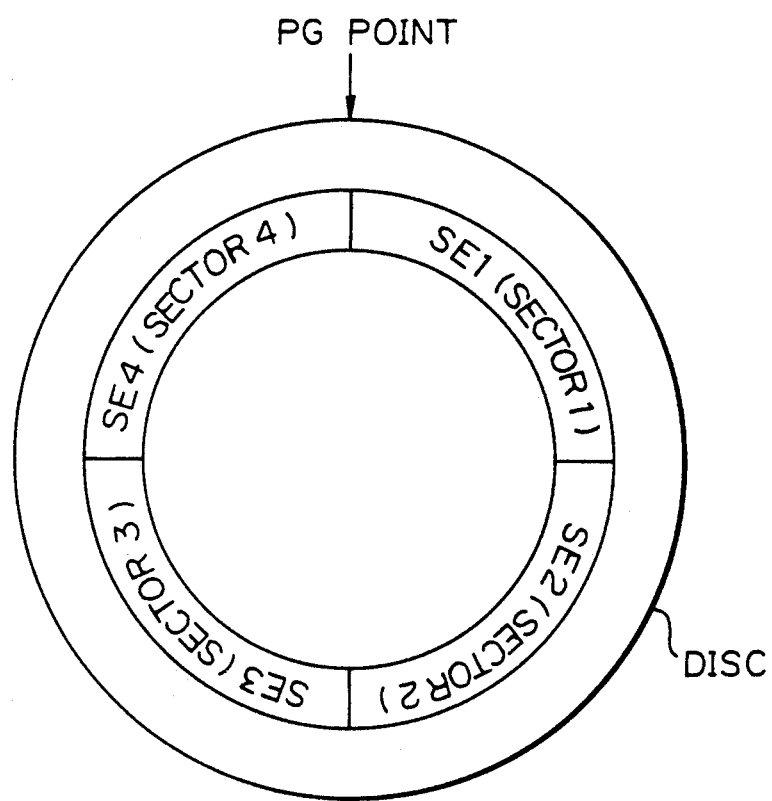
FIGS. 7A and 7B are charts showing a recording format of an audio signal.
Figure 7B:
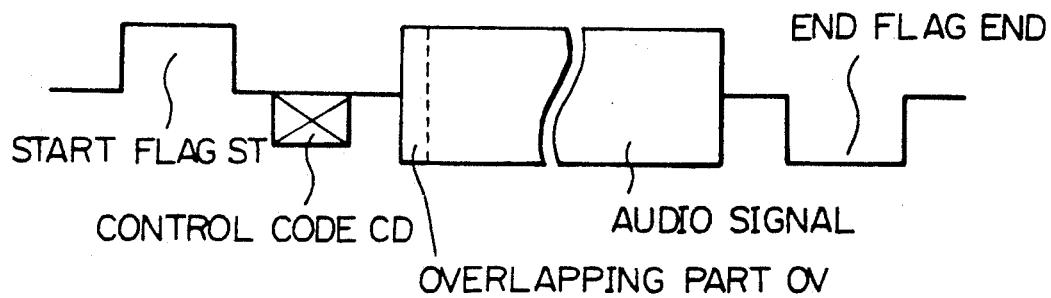

In the following, the recording format of the audio signal will be briefly explained. The audio signal is recorded on the disk with time-axis compression. FIG. 7A shows one of the audio tracks recorded on tracks formed on the magnetic disk. Each audio track is divided into four sectors, S1, S2, S3 and S4. FIG. 7B shows an example of the sector format. Each sector is started by a start flag ST constituting a start signal of the audio sector. Then, provided are a control code CD containing, for example, the time-axis compression rate of the audio signal, a video signal address corresponding to the audio signal, and the start track address and succeeding track address if the audio signal is recorded over a plurality of tracks. In a succeeding portion, an audio signal is recorded with time-axis compression, including an overlapping part OV for maintaining continuity of the sound between sectors. Behind the recording area of the audio signal, an end flag is recorded, indicating the end of a sector. A flag detection block 33 shown in FIG. 1 can identify an audio recording track by detecting the start flag of the audio sector shown in FIG. 7B. As the start flags ST are present at the start points of four sectors in a case of audio recording, the timing generator 34 generates gate pulses at periods corresponding to the recording areas of the start flags, based on the PG signal generated once in every turn of the magnetic disk, thereby identifying the presence or absence of the start flags.

Figure 2A:
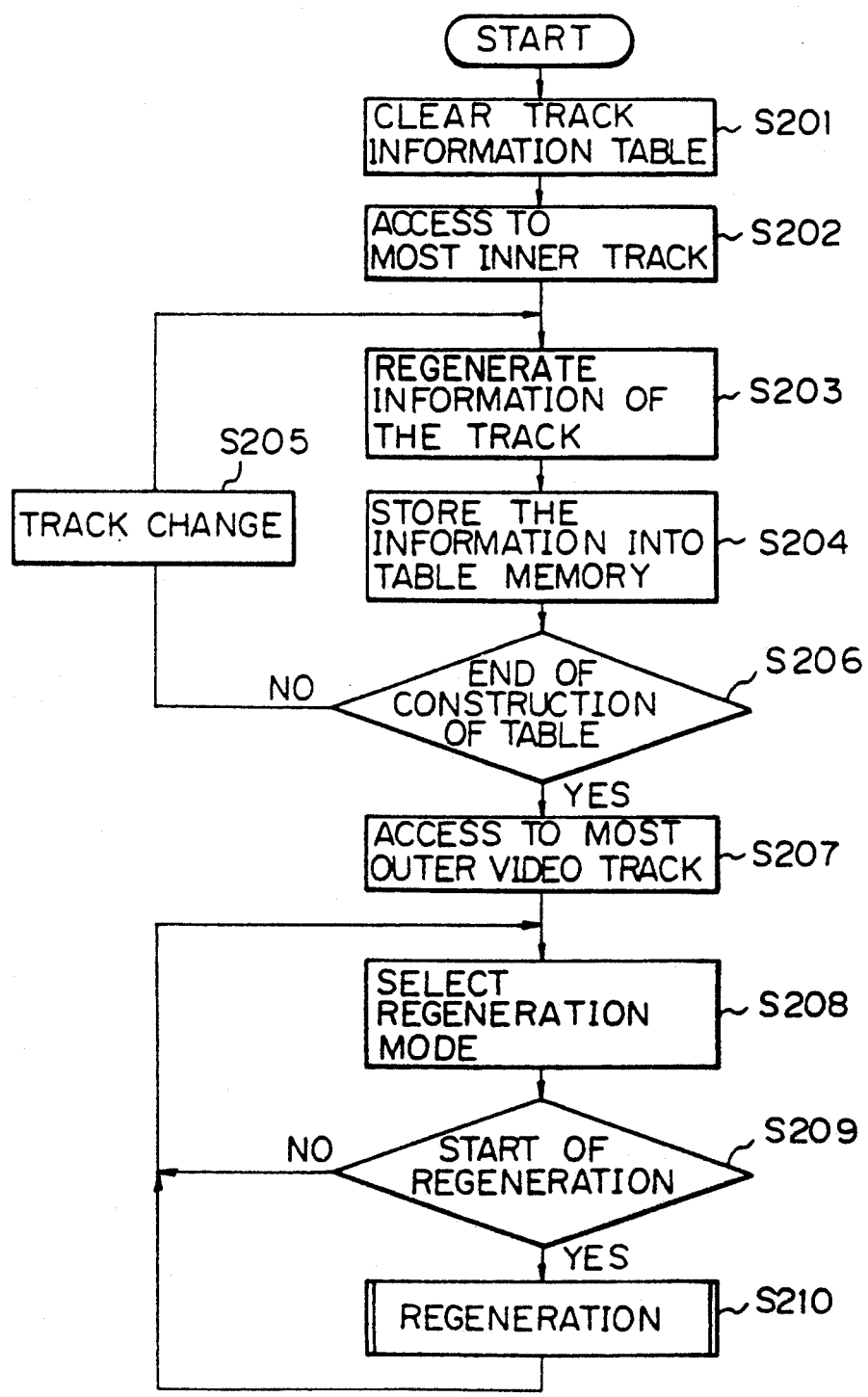
FIGS. 2A and 2B are flow charts showing the control sequence of a system controller 40 shown in FIG. 1.
Figure 2B:
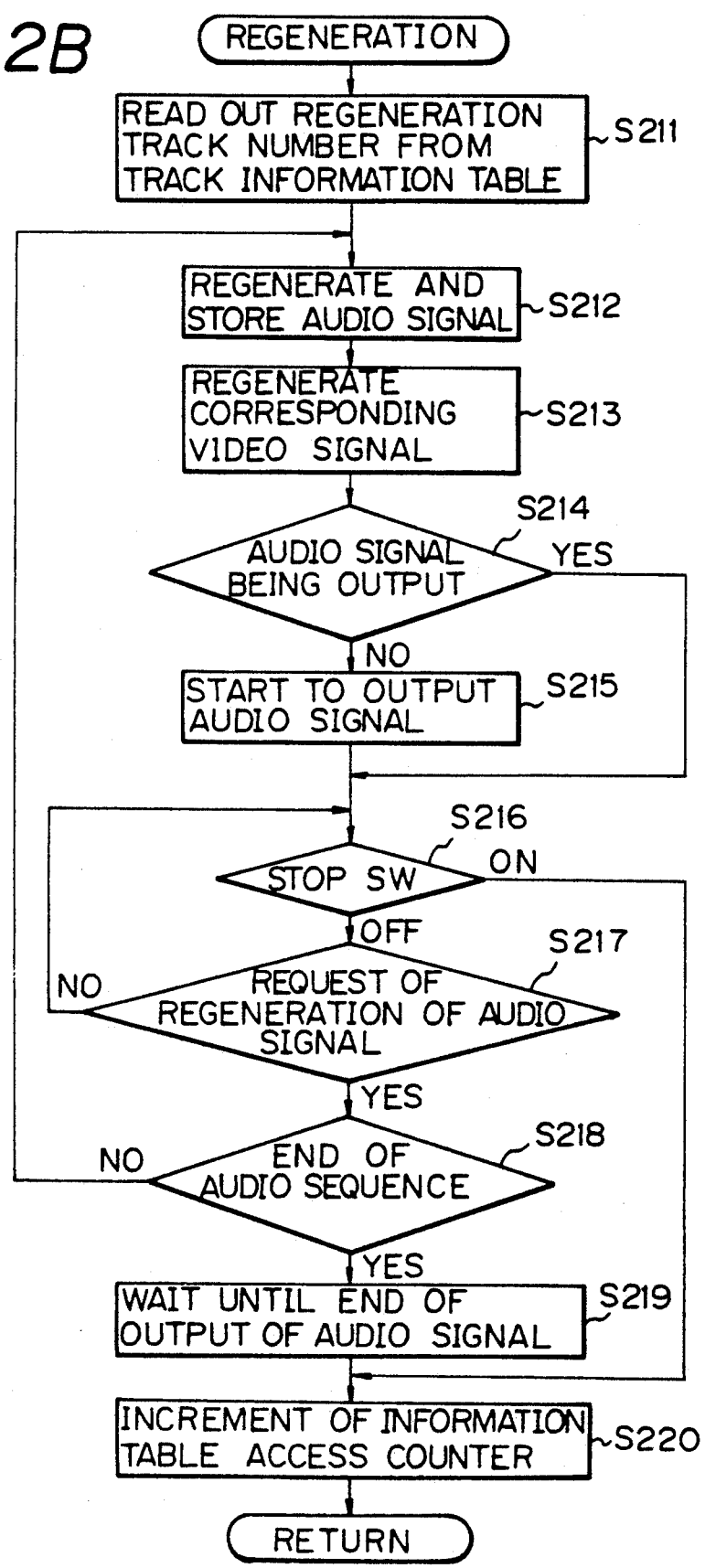

FIG. 2A is a flow chart of the control sequence of the system controller 40, and FIG. 2B shows the details of a reproduction or regeneration routine shown in FIG. 2A. Now, reference is made to FIGS. 2A and 2B for explaining the function of the above-explained apparatus. When the video floppy disk 10 is loaded, the system controller 40 clears the table memory 56 (S201), and moves the magnetic head 12 to the innermost track (S202). Then, it regenerates the data of that track such as control codes (S203), and stores such data in a corresponding position of the table memory 56, by means of detection circuits 50, 52 and a synchronization signal separating circuit 62 (S204).

The track is identified as containing recording if the output is obtained from the RF detection circuit 63. If recording is present, and if the output is obtained from the synchronization signal separating circuit 62, the recording is identified as a video signal. On the other hand, if recording is present, and if the output is not obtained from the synchronization signal separating circuit 62, the recording is identified as an audio signal.

In a track which is identified as containing a recorded audio signal, the position of the control code CD is identified from the position of the start flag ST detected by the identification signal detecting circuit 52, and the information signal detecting circuit 50 identifies the control code and sends it to the system controller 40. The system controller 40 detects, from the control code, the track number containing a video signal corresponding to the recorded audio signal, and stores the track number in the table memory.

Also, in a track containing an audio signal, it is identified, from the polarity of the start flag and the end flag, whether the audio signal is to be continued to a succeeding track or to be completed in the present track.

Subsequently, the above-explained operation is repeated for all the tracks of the disk 10 (S203–S206).

When the data table is prepared for all the tracks, the image recorded on the outermost track is reproduced, based on the table, and displayed on the monitor 58. In this state, the keyboard 60 is enabled for data input, and the conditions of various reproduction modes are entered through the keyboard 60 (S208).

When a request for starting the reproduction is entered from the keyboard 60 (S209), the image or sound recorded on the disk 10 is reproduced in a reproduction mode selected at that point (S210).

In the reproduction routine (FIG. 2B), the number of a recording track matching the condition of the reproduction mode is selected from the track information table prepared at the loading of the disk 10. More specifically, in a case of audio reproduction, an audio track number of the information table indicated by the information table access counter is taken out (S211), and then, the magnetic head 12 is moved to the track of the number whereby the recorded audio signal is reproduced and stored in the memory 28 (S212). The position of a track storing the image corresponding to the audio signal can be known from the control code data CD simultaneously reproduced with the audio signal, and the magnetic head 12 is moved to the video recording track for reproducing the image (S213).

When the audio signal stored in the memory 28 is not reproduced in a real-time basis, the audio signal recorded with time-axis compression is reproduced with time-axis expansion, thus initiating the real-time reproduction (S214, S215). The sequence waits, monitoring the value of the address counter 30, until the remainder of the audio signal stored in the memory 28 is reduced and the reproduction of a succeeding audio signal becomes necessary (S217). Then, the track storing the succeeding audio signal is determined from the control code reproduced at the preceding reproduction of the audio signal, and then, the magnetic head 12 is moved to that track and the above-explained sequence of steps S212 to S218 is repeated until a series of audio signals is completed. As explained above, the end of the audio signal can be identified by the flags placed before and after the audio signal in the track recording.

If reproduction from the succeeding audio track is no longer necessary, the sequence waits until all the audio signals stored in the memory 28 are reproduced in a real-time basis (S219), and the reproducing operation is terminated by increasing or decreasing the value of the information table access counter.

TABLE 1

| Audio Reproduction switch | Video reproduction switch | Reproduction Audio | Reproduction Video | Reproduction mode |
|---|---|---|---|---|
| ON | ON | ○ | ○ | #1 |
|  | OFF | ○ |  | #2 |
| OFF | ON |  | ○ | #3 |

(○: reproduced)

In the following various reproduction modes will be explained. Table 1 shows the relationship between the state of the audio reproduction switch and the video reproduction switch provided on the keyboard 60, and various reproduction modes for the signals recorded on the disk 10. The reproduction mode #1 reproduces both sound and image, while the reproduction mode #2 reproduces the sound only, and the reproduction mode #3 reproduces the image only.

The keyboard 60 is also equipped with an audio/video preferential switch, which gives priority to the sound or image in the reproduction.

As an example, if the images and sounds are recorded on the disk 10 as shown in FIG. 3, various sequences of reproduction can be obtained, as shown in FIG. 4, according to the reproduction modes. In FIGS. 3 to 6, V and A respectively stand for video and audio. Subscripts to V indicate track numbers, while those to A indicate the audio sequence numbers, and superscripts to A indicate the order of reproduction in an audio sequence.

In the video preferential mode, reproduction according to the audio sequence is conducted after a video track, corresponding to the first track of an audio sequence, is reproduced. In the audio preferential mode, reproduction according to the audio sequence is conducted after access is made to the first track of an audio sequence. The images not corresponding to the sound are reproduced, in these reproduction modes, in succession from the outer tracks. In the foregoing example, access is made from the outer track toward the inner one, but the order of reproduction becomes inverse to that shown in FIG. 4 if the access is made from the inner track toward the outer one.

In the present embodiment, the combination of the audio reproduction switch and the video reproduction switch provides reproduction modes as shown in FIGS. 4 and 6 and the combinations thereof.

More specifically, when the audio reproduction switch is turned off, video signals alone are reproduced, but audio signals are not reproduced from a disk containing audio signals and video signals in a mixed manner.

On the other hand, when the video reproduction switch is turned off, the video signal is not reproduced.

The present embodiment can select these modes in a simple manner.

In the example shown in FIG. 4, when the video reproduction switch is turned off and the audio reproduction switch is turned on, the image corresponding to the sound is not displayed on the monitor 58, but it is, of course possible to display, on the monitor 58, only the images corresponding to the sound.

Now, reference is made to FIGS. 5 and 6 for explaining the search operation of an audio sequence. When the search switch in the keyboard 60 is depressed, the system controller 40 automatically turns on the audio reproduction switch. When audio reproduction is not conducted in the video preferential mode in which an image $V_8$ is displayed on the monitor 58, and in the case of a search toward the inner side, as the current image $V_8$ corresponds to the sound $A_2^1$, the monitor displays an image $V_5$ corresponding to the sound $A_1^1$ and the sequence reaches a stand-by state. In the case of a search toward the outer side, an image $V_2$ corresponding to the sound $A_3^1$ is displayed and the stand-by state is reached. In the audio preferential mode, in the case of the search toward the inner side, the stand-by state is reached after the display of an image $V_2$ corresponding to the sound $A_3^1$. In the search toward the outer side, the stand-by state is reached after the display of an image $V_5$ corresponding to the sound $A_1^1$.

When the image $V_8$ is displayed in the course of audio reproduction, the destination of a search operation by the search switch is the same as that explained above in various reproduction modes, but the reproduction is continued from the destination of the search operation.

If the disk 10 has an empty track, such an empty track is skipped in the reproducing operation. The access to the tracks is conducted in a cyclic manner, so that access to the innermost track is followed by access to the outermost track, or vice versa.

In the above-explained embodiment, there is not provided a memory for an image signal, but the use of an image memory capable of storing image signals of a frame dispenses with the necessity of an image signal from the disk, for example, in the stand-by state, thereby reducing damage to the disk and giving additional time for a next track access.

The embodiment utilizes three switches for selecting the reproduction modes, but such switches may be replaced, for example, by a rotary switch capable of directly selecting the reproduction modes.

As will be readily understandable from the foregoing explanation, the present invention enables flexible selection in the order of reproduction not defined in the recording format, thereby increasing the efficiency of utilization a recording medium.

The foregoing embodiment is limited to an apparatus utilizing a magnetic disk as a recording medium having a plurality of recording blocks, but such a medium can, of course be composed of an optical disk or a solid-state memory such as a semiconductor memory.

In addition, the present invention is subject to various modifications within the scope and spirit of the appended claims.

What is claimed is:

1. A reproduction apparatus comprising:
   memory means comprising a plurality of memory blocks for storing information in each of said memory blocks;
   determining means for determining whether the information stored in each of said memory blocks of said memory means comprises an audio signal or a video signal;
   designating means for designating, free from designating a block number, reproduction of a video signal without an audio signal, the video signal being stored in said memory means; and
   reproducing means operable in response to the designation by said designating means, said reproducing means comprising means for selecting only the memory block determined by said determining means to be storing a video signal, and means for reproducing information from the selected memory block.

2. A reproduction apparatus according to claim 1, wherein said memory means comprises a disc recording medium.

3. A reproduction apparatus according to claim 2, wherein said plurality of memory blocks comprise concentric circular tracks formed on the recording medium.

4. A reproduction apparatus according to claim 2, wherein said reproducing means further comprises a reproduction head movable in the radial direction of the recording medium and moving means for moving said reproduction head.

5. A reproduction apparatus according to claim 3, wherein said reproducing means further comprises means for sequentially reproducing the tracks of the recording medium from an outer track to an inner track.

6. A reproduction apparatus comprising:
   memory means comprising a plurality of memory blocks for storing information in each of said memory blocks;
   determining means for determining whether the information stored in each of said memory blocks of said memory means comprises an audio signal or a video signal;
   designating means for designating, free from designating a block number, reproduction of an audio signal without a video signal, the audio signal being stored in said memory means; and reproducing means operable in response to the designation by said designation means, said reproducing means comprising means for selecting only the memory block determined by said determining means to be storing an audio signal, and means for reproducing information from the selected block.

7. A reproduction apparatus according to claim 6, wherein said reproducing means further comprises at least two reproduction processors for reproducing information from the selected block determined to be storing an audio signal.

8. A reproduction apparatus according to claim 6, wherein said memory means comprises a disc recording medium.

9. A reproduction apparatus according to claim 8, wherein said plurality of memory blocks comprise concentric circular tracks formed on the recording medium.

10. A reproduction apparatus according to claim 6, wherein said reproducing means further comprises a reproduction head movable in the radial direction of the recording medium and moving means for moving said reproduction head.

* * * * *